(12) United States Patent
Valera et al.

(10) Patent No.: US 12,242,059 B2
(45) Date of Patent: Mar. 4, 2025

(54) DISPLAY FOR AUGMENTED REALITY

(71) Applicant: Snap Inc., Santa Monica, CA (US)

(72) Inventors: Mohmed Salim Valera, Abingdon (GB); Sebastien De Cunsel, Abingdon (GB); Gleb Siroki, Abingdon (GB)

(73) Assignee: Snap Inc., Santa Monica, CA (US)

( * ) Notice: Subject to any disclaimer, the term of this patent is extended or adjusted under 35 U.S.C. 154(b) by 494 days.

(21) Appl. No.: 17/594,592

(22) PCT Filed: Mar. 23, 2020

(86) PCT No.: PCT/GB2020/050775
§ 371 (c)(1),
(2) Date: Oct. 22, 2021

(87) PCT Pub. No.: WO2020/217044
PCT Pub. Date: Oct. 29, 2020

(65) Prior Publication Data
US 2022/0197036 A1   Jun. 23, 2022

(30) Foreign Application Priority Data

Apr. 25, 2019 (GB) ..................................... 1905773

(51) Int. Cl.
*G02B 27/01* (2006.01)
*G02B 1/00* (2006.01)
*G02B 27/42* (2006.01)
(52) U.S. Cl.
CPC ......... *G02B 27/0172* (2013.01); *G02B 1/005* (2013.01); *G02B 27/4222* (2013.01); *G02B 27/4272* (2013.01)
(58) Field of Classification Search
CPC .............. G02B 27/0172; G02B 27/017; G02B 2027/0178; G02B 27/0174; G02B 1/005
See application file for complete search history.

(56) References Cited

U.S. PATENT DOCUMENTS

2018/0004321 A1   1/2018   Kuroiwa
2018/0157042 A1   6/2018   Wall et al.
(Continued)

FOREIGN PATENT DOCUMENTS

CN    107209372 A    9/2017
CN    107615136 A    1/2018
(Continued)

OTHER PUBLICATIONS

International Search Report and Written Opinion dated Jun. 12, 2020 for international application PCT/GB2020/217044.
(Continued)

*Primary Examiner* — Ryan D Howard
(74) *Attorney, Agent, or Firm* — Schwegman Lundberg & Woessner, P.A.

(57) ABSTRACT

An augmented reality device is provided and comprises a waveguide (306); an input diffractive optical element (301) positioned in or on the waveguide (306) configured to receive light from a projector and to couple the light into the waveguide (306) so that it is captured within the waveguide (306) by total internal reflection; an output diffractive optical element (304) positioned in or on the waveguide (306) configured to couple totally internally reflected light out of the waveguide (306) towards a viewer; and a returning diffractive optical element (307, 309, 312) positioned in or on the waveguide (306) configured to receive light from the output diffractive optical element (304) and to diffract the received light so that it is returned towards the output diffractive optical element (304).

20 Claims, 8 Drawing Sheets

(56) References Cited

U.S. PATENT DOCUMENTS

| | | |
|---|---|---|
| 2018/0210205 A1 | 7/2018 | Grey et al. |
| 2018/0324402 A1 | 11/2018 | Lowney et al. |
| 2019/0004321 A1 | 1/2019 | Grey et al. |

FOREIGN PATENT DOCUMENTS

| | | |
|---|---|---|
| CN | 107690599 A | 2/2018 |
| CN | 108139593 A | 6/2018 |
| CN | 108873350 A | 12/2018 |
| CN | 109073886 A | 12/2018 |
| CN | 109073909 A | 12/2018 |
| CN | 208188393 U | 12/2018 |
| EP | 3547008 | 10/2019 |
| EP | 3959552 A1 | 3/2022 |
| EP | 3959552 B1 | 4/2023 |
| GB | 201813535 | 10/2018 |
| GB | 2566788 | 3/2019 |
| TW | 202043829 A | 12/2020 |
| TW | I742610 B | 10/2021 |
| WO | 2016020643 | 2/2016 |
| WO | WO-2018091862 A1 | 5/2018 |
| WO | 2020217044 | 10/2020 |

OTHER PUBLICATIONS

"International Application Serial No. PCT/GB2020/050775, International Preliminary Report on Patentability mailed Mar. 3, 2021", 6 pgs.

"Chinese Application Serial No. 202080031206.4, Response Filed Jul. 24, 2024 to Office Action mailed Mar. 28, 2024", w/ English Claims, 11 pgs.

"European Application Serial No. 20716544.0, Indication of deficiencies in a request under Rule 22 EPC mailed Aug. 10, 2022", 2 pgs.

"European Application Serial No. 20716544.0, Invitation To Remedy Deficiencies in a Request Under Rule 22 EPC mailed Sep. 9, 2022", 2 pgs.

"European Application Serial No. 20716544.0, Response to Communication pursuant to Rules 161(1) and 162 EPC filed Jun. 8, 2022", 49 pgs.

"Taiwanese Application Serial No. 109112323, Office Action mailed Feb. 23, 2021", w/ English Machine Translation, 30 pgs.

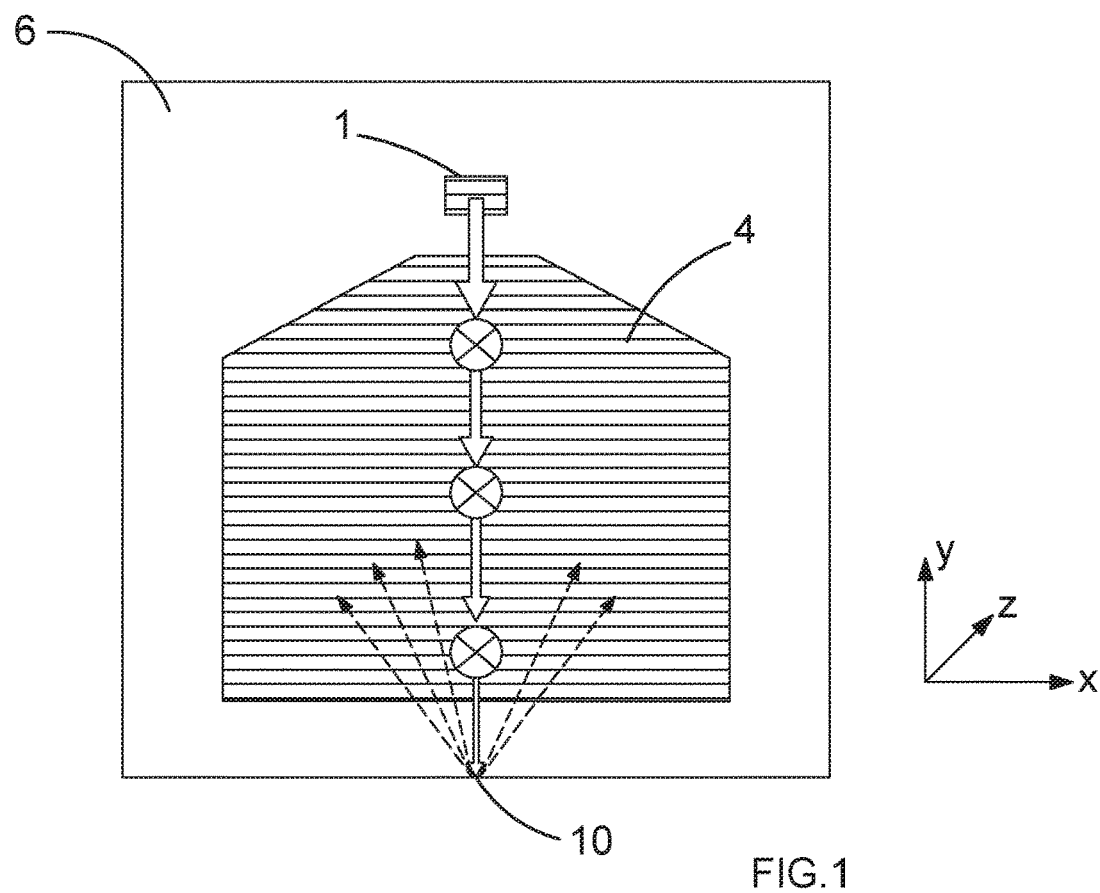
FIG.1
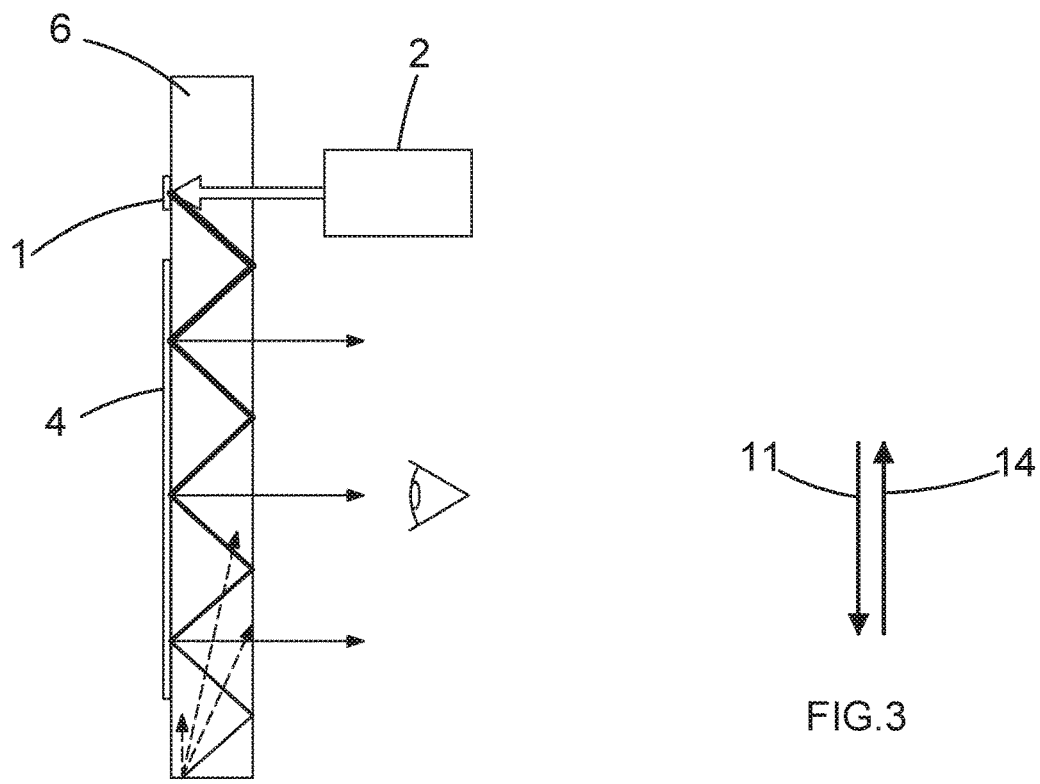
FIG.2
FIG.3

DISPLAY FOR AUGMENTED REALITY

This application is a national stage filing under 35 U.S.C. § 371 of International Patent Application No. PCT/GB2020/050775, filed Mar. 23, 2020, which claims the benefit of Great Britain Application No 1905773.6 filed Apr. 25, 2019, each of which is incorporated by reference herein in its entirety.

The present invention relates to a display for augmented reality applications.

In an augmented reality headset a transparent waveguide is provided in front of a user's eye or eyes. A light projector transmits light towards the waveguide. Light can be coupled into the waveguide by an input diffraction grating. Light then propagates within the waveguide by total internal reflection and an output diffraction grating couples light out of the waveguide and towards a viewer. In use, a viewer can see light from their external environment, transmitted through the transparent waveguide, as well as projected light from the projector. This can provide an augmented reality experience. A virtual reality headset works in a similar way, except that the user can only see projected light, and cannot see any light from their external environment.

One challenge in the field of augmented reality devices is to improve the contrast of the image that is output to the viewer. An object of the present invention is to address this issue.

According to an aspect of the invention there is provided an augmented reality device, comprising: a waveguide; an input diffractive optical element positioned in or on the waveguide configured to receive light from a projector and to couple the light into the waveguide so that it is captured within the waveguide by total internal reflection; an output diffractive optical element positioned in or on the waveguide configured to couple totally internally reflected light out of the waveguide towards a viewer; and a returning diffractive optical element positioned in or on the waveguide configured to receive light from the output diffractive optical element and to diffract the received light so that it is returned towards the output diffractive optical element.

In this way, the returning diffractive optical element can reduce scatter at the edge of the waveguide by returning light to the output diffractive optical element. This allows unused light at the edge of the waveguide to be recycled back towards the output diffractive optical element where it can be coupled towards a viewer. Advantageously this improves the contrast of the augmented reality device by reducing stray light in the output region. Additionally, this improves optical efficiency in the device because more of the light from the projector can be coupled towards the viewer, rather than being wasted in scattered rays.

Light is preferably received at the returning diffractive optical element from the direction of the output diffractive optical element, although the light is preferably undiffracted by the output diffractive optical element in the sense that the light received at the returning diffractive optical element is light that is not coupled out of the waveguide by the output diffractive optical element. In some embodiments there may be some diffractive interaction with light in the output diffractive optical element before it is received at the returning diffractive optical element, but such diffractive interaction preferably only turns light within the waveguide rather than coupling it out of the waveguide and towards a viewer.

Preferably rays of light that are coupled out of the waveguide towards a viewer undergo diffraction by a plurality of diffractive optical elements having grating vectors that combine to produce a resultant vector with substantially zero magnitude. In this way, light can be coupled out of the waveguide with substantially no angular and chromatic dispersion.

Of course, there may be a very large number of possible optical paths by which light can be coupled from a projector towards a viewer. In general terms, we can consider at least two groups of optical paths. In the first group of optical paths, light may be diffracted by the input diffractive optical element, coupled into the waveguide whereupon it undergoes total internal reflection, and then coupled out of the waveguide by the output diffractive optical element without interacting with the returning diffractive optical element. In the second group of optical paths, light may be diffracted by the input diffractive optical element, and coupled into the waveguide whereupon it undergoes total internal reflection. In the second group, the light is then diffracted by the returning diffractive optical element before being coupled out of the waveguide by the output diffractive optical element. In both the first and second group of optical paths, the grating vectors of the diffractive optical elements that diffract the light preferably combine to produce a resultant with substantially zero magnitude.

The resultant vector of the grating vectors for the input diffractive optical element and the output diffractive optical element may combine to produce a resultant vector with substantially zero magnitude. This can allow some optical paths to be output with no angular or chromatic aberration.

The resultant vector of the grating vectors for the input diffractive optical element, the returning diffractive optical element and the output diffractive optical element may combine to produce a resultant vector with substantially zero magnitude. In this way, light can be coupled out of the waveguide with substantially no angular and chromatic dispersion for another group of optical paths.

In some embodiments there may be an intermediate diffractive optical element positioned in or on the waveguide between the input diffractive optical element and the output diffractive optical element (i.e. from the perspective of the optical path). The intermediate diffractive optical element may be oriented at an angle that allows light to be expanded in a first dimension before it encounters the output diffractive optical element. The output diffractive optical element can then expand light in a second dimension, which may be perpendicular to the first dimension.

Preferably the grating vectors for the input diffractive optical element, the intermediate diffractive optical element and the output diffractive optical element combine to produce a resultant vector with substantially zero magnitude. Preferably the grating vectors for the input diffractive optical element, the intermediate diffractive optical element, the returning diffractive optical element and the output diffractive optical element combine to produce a resultant vector with substantially zero magnitude.

The output diffractive optical element may comprise first and second output diffractive optical elements overlaid on one another in or on the waveguide. The first output diffractive optical element may be configured to receive light from an input direction and couple it towards the second output diffractive optical element which can then provide outcoupled orders towards a viewer. The second output diffractive optical element may be configured to receive light from an input direction and couple it towards the first output diffractive optical element which can then provide outcoupled orders towards a viewer. The output diffractive optical element may comprise a plurality of optical structures in a photonic crystal, and the plurality of optical structures may be arranged in an array to provide the first and second output diffractive optical elements. In this configuration there may be first and second returning diffractive optical elements. The first returning diffractive optical element may be positioned to receive light from the first output diffractive optical element and to diffract the received light so that it is returned towards the output diffractive optical element when can then provide outcoupled orders towards a viewer. The second returning diffractive optical element may be positioned to receive light from the second output diffractive optical element and to diffract the received light so that it is returned towards the output diffractive optical element when can then provide outcoupled orders towards a viewer. The first returning diffractive optical element may have grooves which are aligned with the grooves of the first diffractive optical element (and, correspondingly, grating vectors which are aligned). The second returning diffractive optical element may have grooves which are aligned with the grooves of the second diffractive optical element. In another configuration, the first and second returning diffractive optical elements may have grooves which are perpendicular to the grooves of the input diffractive optical element. The pitches of the grooves in the first and second returning diffractive optical elements are preferably selected so that the grating vectors of the various diffractive optical elements that combine to produce an outcoupled order to the viewer can be combined additively to produce a resultant vector with substantially zero magnitude.

The device may further comprise a third returning diffractive optical element positioned to receive light from the first and second output diffractive optical elements and to diffract the received light so that it is returned towards the first and second output diffractive optical elements. In this way, the returning diffractive optical elements can effectively recycle light extending towards the edges of the waveguide within a photonic crystal structure. This can facilitate use of a photonic crystal that simultaneously expands light in two dimensions while improving contrast within the output diffractive optical element.

In one embodiment the third returning diffractive optical element may have grooves in the same orientation as the grooves in the input diffractive optical element. In another embodiment the third returning diffractive optical element may have first and second portions with grooves in different orientations. Specifically, the first and second portions may have grooves that are oriented at ±60° to the y-axis, which is the direction in which the input diffractive optical element couples light towards the output diffractive optical element in the waveguide. This configuration can effectively return light towards the output diffractive optical element, thereby reducing scatter from waveguide edges, whether the light is undiffracted within the output diffractive optical element, or whether a single turning diffraction has occurred such that the light has been re-directed within the output diffractive optical element but is still captured within the waveguide by total internal reflection. This may return light towards the output diffractive optical element for a higher number of optical paths, thereby minimising scatter from waveguide edges and improving contrast for the augmented reality image.

Embodiments of the invention are now described, by way of example, with reference to the drawings, in which:

FIG. 1 is a top view of a known waveguide;

FIG. 2 is a side view of the waveguide shown in FIG. 1;

FIG. 3 is a schematic diagram showing grating vectors for diffractive optical elements in the waveguide shown in FIG. 1;

Figure 4:
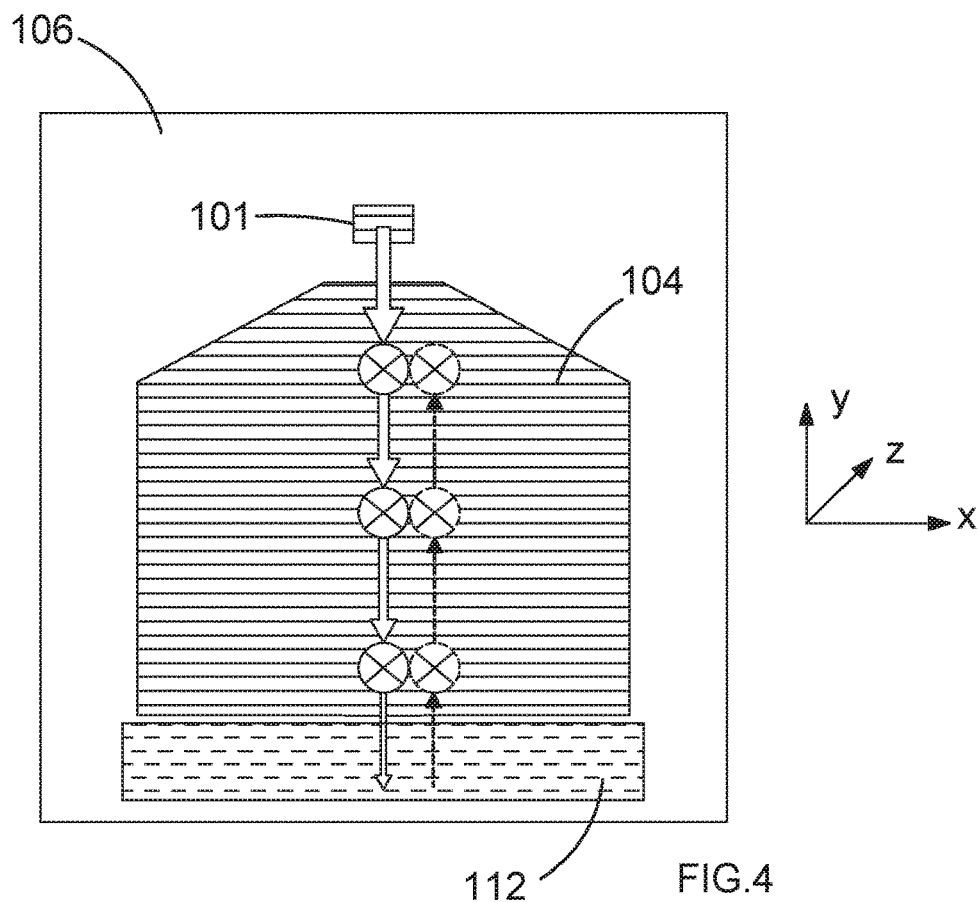
FIG. 4 is a top view of a waveguide in an embodiment of the present invention.

FIG. 1 is a top view of a known waveguide 6. FIG. 2 is a side view of the same waveguide 6. An input diffraction grating 1 is provided on a surface of the waveguide 6 for coupling light from a projector 2 into the waveguide 6. Light that is coupled into the waveguide 6 travels by total internal reflection towards an output grating 4. In this arrangement the input and output gratings 1, 4 can be surface relief gratings having grooves that are parallel to one another. The input grating 1 is typically a blazed grating that preferentially diffracts light in the direction of the output grating 4. In this arrangement the grooves of the input grating 1 and the output element 4 extend in a direction that is parallel to the x-axis in the Cartesian reference frame of FIG. 1.

Each diffractive optical element comprises a grating vector in the plane of its grooves. A grating vector has a direction that is normal to the grooves and a magnitude which is inversely related to the pitch (i.e. the separation) of the grooves. The direction of the grating vector (positive or negative) is determined by the polarity of the diffracted order of the light. FIG. 3 shows the grating vectors of the input grating 11 and the output element 14 from the perspective of the optical path that couples light towards a viewer. Along the optical path the grating vectors 11, 14 are equal in magnitude but opposite in direction because the grating vector 11 for the input grating diffracts light into a +1 order and the grating vector 14 for the output grating 14 diffracts light into a −1 order (of course, viewed from a different perspective these polarities could equally be reversed). Adding the two grating vectors 11, 14 together produces a resultant vector having substantially zero magnitude. This configuration is chosen so that light outcoupled by the output element 4 experiences no chromatic or angular dispersion.

Light captured within the waveguide 6 by total internal reflection interacts with the output grating 4 multiple times. At each interaction with the output grating 4 light is either diffracted and coupled out of the waveguide 6 towards the viewer, or else it is undiffracted in which case the light continues to propagate away from the input grating 1 in the negative y-direction. The proportion of light that is diffracted versus undiffracted is determined by the diffraction efficiency of the output grating 4. The diffraction efficiency is chosen so that light can be coupled out of the waveguide and towards a viewer along the full length of the output grating 4 in the direction of the y-axis. If the diffraction efficiency of the output grating 4 is constant along the y-axis then the brightness of light may reduce in the negative y-direction. This is because less and less light remains captured by total internal reflection as light progresses within the waveguide; this phenomenon is indicated schematically by the breadth of the arrows depicting optical paths in FIGS. 1 and 2.

A certain proportion of light remains undiffracted by the output grating 4, and continues to propagate in the negative y-direction under total internal reflection. This light is typically scattered by an edge 10 of the waveguide 6. Scattered light can be undesirably directed back towards the output grating 4. It has been determined that scattered light can produce background light that reduces the contrast of the augmented reality image that is coupled towards a viewer by the output grating 4.

In other known arrangements the output grating 4 can be replaced by more sophisticated output elements, such as those disclosed in WO 2016/020643, for example. In WO 2016/020643 an arrangement is disclosed where the output element expands light in two dimensions in an augmented reality display. This arrangement has been found to be very effective at simultaneously expanding light in two dimensions and coupling light out of the waveguide. It has been determined that scattering from waveguide edges can similarly reduce the contrast of an augmented reality image in more sophisticated output elements such as these.

For simplicity the arrangement in FIGS. 1 to 3 has been described in the context of a single projector and a single waveguide. However, the skilled person will appreciate that multiple waveguides and projectors can be used in different configurations. It is common, for example, to use a stack of three waveguides each of which is optimised for a different primary colour in order to produce a full colour augmented reality image. The same issues can arise in multiple waveguide stacks regarding back scatter from waveguide edges.

Figures 5, 6:
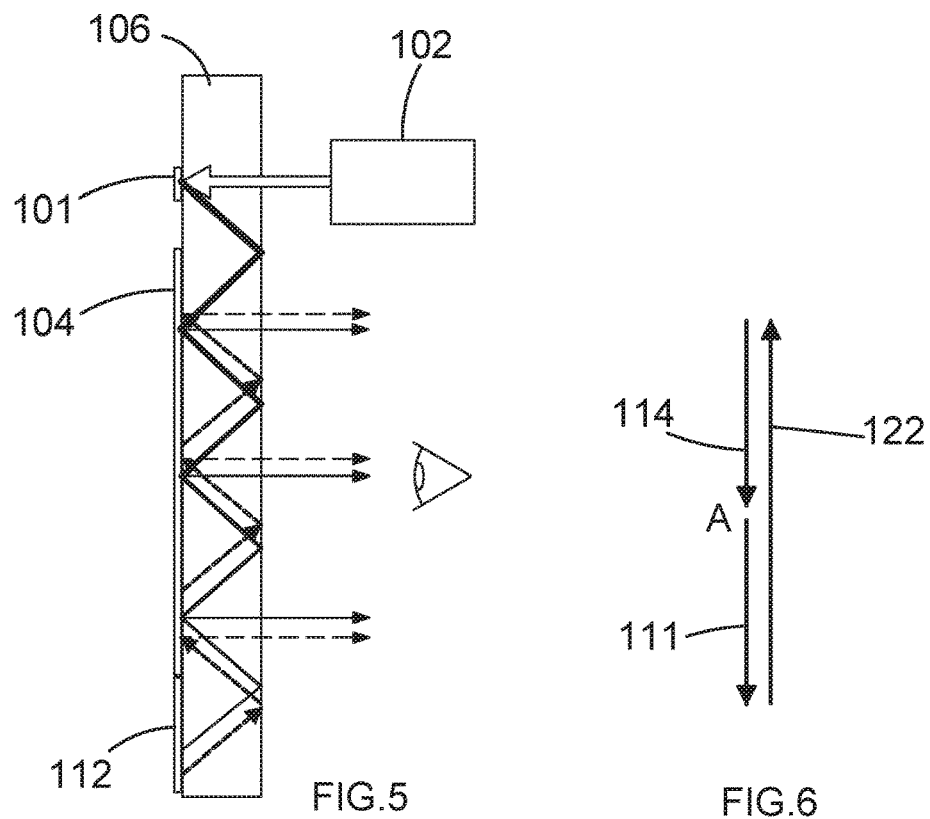
FIG. 5 is a side view of the waveguide shown in FIG. 4.
FIG. 6 is a schematic diagram showing grating vectors for diffractive optical elements in the waveguide shown in FIG. 4.

FIG. 4 is a top view of a waveguide 106 in an embodiment of the invention. FIG. 5 is a side view of the same waveguide 106. The configuration is similar to that of FIGS. 1 and 2, and an input diffraction grating 101 is provided on a surface of the waveguide 106 for coupling light from a projector 102 into the waveguide 106. Light that is coupled into the waveguide 106 travels by total internal reflection towards an output grating 104, and the input and output gratings 101, 104 are surface relief gratings having grooves that are parallel to one another.

In this configuration the device further includes a return grating 112. The return grating 112 is positioned so that it receives light that is undiffracted from the output grating 104. The return grating 112 diffracts light so that it is directed back towards the output grating 104 in the positive y-direction. Returned light is then diffracted according to the diffraction efficiency of the output grating 104. Some of the returned light is diffracted by the output grating 104 thereby outcoupling the light towards the viewer. The remainder of the light will continue to propagate in the positive y-direction still captured within the waveguide 106 by total internal reflection; this is indicated schematically by dotted lines in FIGS. 4 and 5. A small proportion of the returned light may remain undiffracted such that it scatters from a top edge of the waveguide 106. However, the amount of undiffracted light would be very small and it is believed that its effect on contrast of the augmented reality image would be minimal.

FIG. 6 is a diagram showing the grating vectors of the input grating 111, the output grating 114 and the return grating 122. The grating vectors are chosen so that light that is coupled out of the waveguide 106 and towards the viewer is diffracted by a number of diffraction gratings having vectors that combine to produce a resultant with zero magnitude. In a first group of optical paths light is diffracted first by the input grating 101 so that it is coupled into the waveguide to undergo total internal reflection. Light in the first group of optical paths is then diffracted by the output grating 104 so that it is coupled out of the waveguide 106 and towards the viewer. The grating vectors 111, 114 are equal in magnitude. In this first group of optical paths the grating vectors 111, 114 are opposite in direction since the optical path involves a positive (+1) diffraction order followed by a negative (−1) diffraction order. As such, the resultant vector has substantially zero magnitude. In the second group of optical paths light is diffracted first by the input grating 101 (in a +1 order), then by the return grating 122 (in a −1 order) and then by the output grating 104 (in a +1 order) so that it is coupled out of the waveguide 106 and towards the viewer. In this situation the grating vectors 111, 114 of the input grating 111 and the output grating 104 are oriented in the same direction and are equal in magnitude. The grating vector of the return grating 122 has twice the magnitude of the grating vector 111 of the input grating and acts in the opposite direction. Thus, the grating vectors combine to produce a resultant that has substantially zero magnitude.

The return grating 112 has a grating vector 122 with the same orientation but twice the magnitude of the grating vector 111 of the input grating 101. This is achieved by providing the return grating 112 with grooves in the same orientation as those of the input grating 101, and by providing a pitch in the return grating 112 which is half of the pitch of grooves in the input grating 101.

Figure 7:
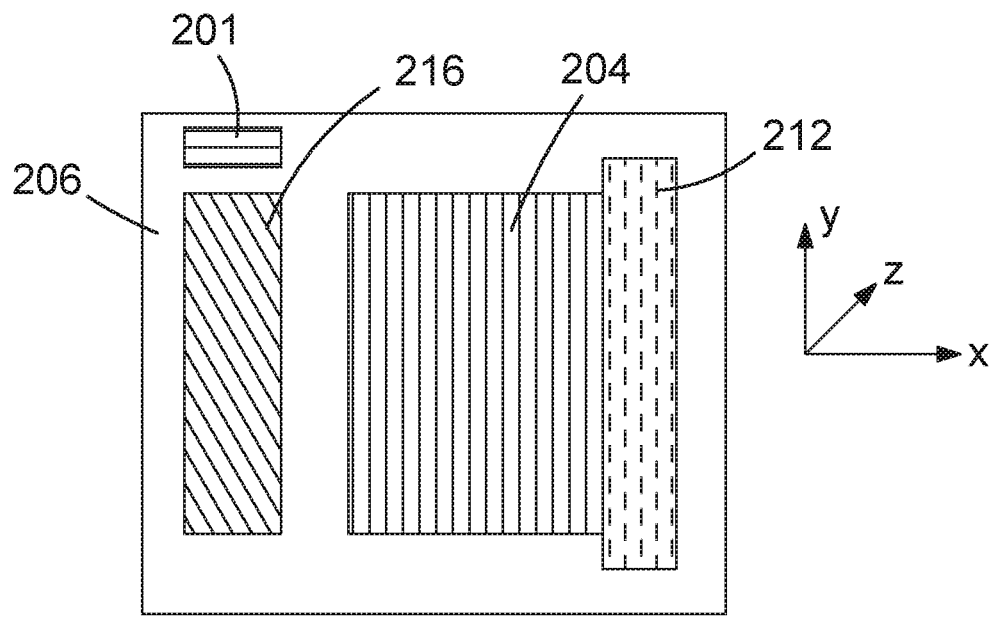
FIG. 7 is a top view of a waveguide in another embodiment of the present invention.

FIG. 7 is a top view of a waveguide 206 in another embodiment of the invention. In this arrangement an input diffraction grating 201 is provided on a surface of the waveguide 206. The grooves of the input grating 201 are oriented parallel to the x-axis in the Cartesian reference frame of FIG. 7. Light from a projector (not shown) is diffracted by the input grating 201 and coupled into the waveguide 206 whereupon it undergoes total internal reflection. Light travels within the waveguide 206 towards an intermediate grating 216. The grooves of the intermediate grating 216 are oriented at +45° to the y-axis, within the x-y plane, which is in the plane of the waveguide 206. Light is diffracted by the intermediate grating 216 towards an output grating 204. Light is diffracted upon each interaction with the intermediate grating 216 as it travels within the waveguide 206 in the negative y-direction, captured within the waveguide 206 by total internal reflection. The diffraction efficiency of the intermediate grating 216 determines the proportion of light that is diffracted towards the output grating 204 versus the proportion of light that is undiffracted and continues to propagate in the negative y-direction. The diffraction efficiency is chosen to allow effective one-dimensional expansion of the light in the y-axis. Light that is diffracted by the intermediate diffraction grating 216 travels in the positive x-direction, still captured within the waveguide 206 by total internal reflection. Light then interacts with the output grating 204. The output grating 204 has grooves that are oriented parallel with the y-axis in the plane of the waveguide 206. The diffraction efficiency of the output grating 204 determines the proportion of light that is diffracted towards a viewer versus the proportion of light that is undiffracted and continues to propagate in the positive x-direction. The diffraction efficiency is chosen to allow effective one-dimensional expansion of the light in the x-axis. This configuration allows two dimensional expansion of light in the y-axis followed by the x-axis so that two-dimensional augmented reality images can be output towards a viewer.

A proportion of light remains undiffracted by the output grating 204. The undiffracted light encounters the return grating 212 which has grooves oriented parallel to the y-axis. Light diffracted by the return grating 212 extends back towards the output grating 204 in the negative x-direction so that it has another opportunity to be diffracted by the output grating 204 and coupled towards a viewer. The return grating 212 has a high diffraction efficiency so that a high proportion of light is returned towards the output grating 204 to reduce the possible impact of scatter at the waveguide edge.

Figure 8:
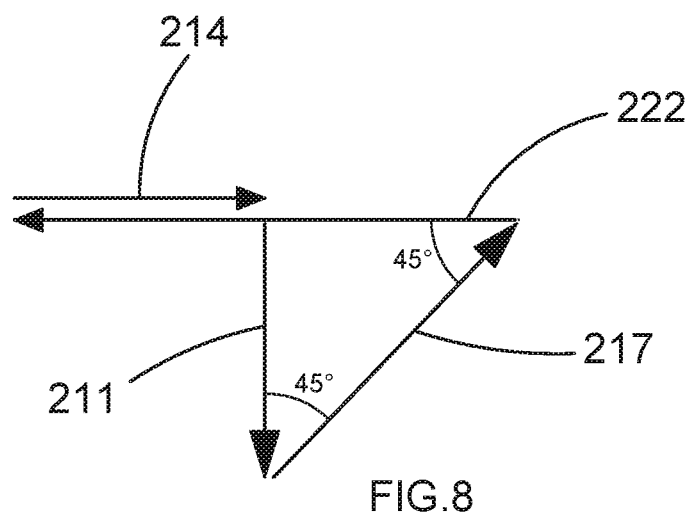
FIG. 8 is a schematic diagram showing grating vectors for diffractive optical elements in the waveguide shown in FIG. 7.

The input, intermediate, output and return gratings 201, 216, 204, 212 are surface relief gratings. FIG. 8 is a diagram showing the grating vectors of the input grating 211, the output grating 214, the intermediate grating 217 and the return grating 222. In a first group of optical paths light is diffracted first by the input grating 201 so that it is coupled into the waveguide 206 to undergo total internal reflection. Light in the first group of optical paths is then diffracted by the intermediate grating 216 and subsequently by the output grating 204 so that it is coupled out of the waveguide 206 and towards the viewer. The grating vectors 211, 217, 214 can be combined in a right angled triangle so that the resultant has substantially zero magnitude. This is achieved because the pitch of the input grating 201 is equal to the pitch of the output grating 204. The intermediate grating 216 has a pitch equal to d·cos (45°), where d is the pitch of the input grating 201 and the output grating 204.

In a second group of optical paths light is diffracted first by the input grating 201 so that it is coupled into the waveguide to undergo total internal reflection. Light is then diffracted by the intermediate grating 216 towards the output grating 204. Light is undiffracted by the output grating 204 and it encounters the return grating 212 which diffracts the light back towards the output grating 204 so that it can be coupled out of the waveguide 206 towards a viewer. Light in the second group of optical paths is therefore diffracted by four gratings before it is coupled towards a viewer. The grating vectors for these gratings 211, 217, 214, 222 can be combined to produce a resultant vector having substantially zero magnitude. This is achieved because the return grating 212 has grooves that are parallel to those in the output grating 204, but the pitch of the grooves in the return grating 212 is half that of the output grating 204; thus, the grating vector 222 for the return grating has twice the magnitude of the output grating vector 214.

Figure 9:
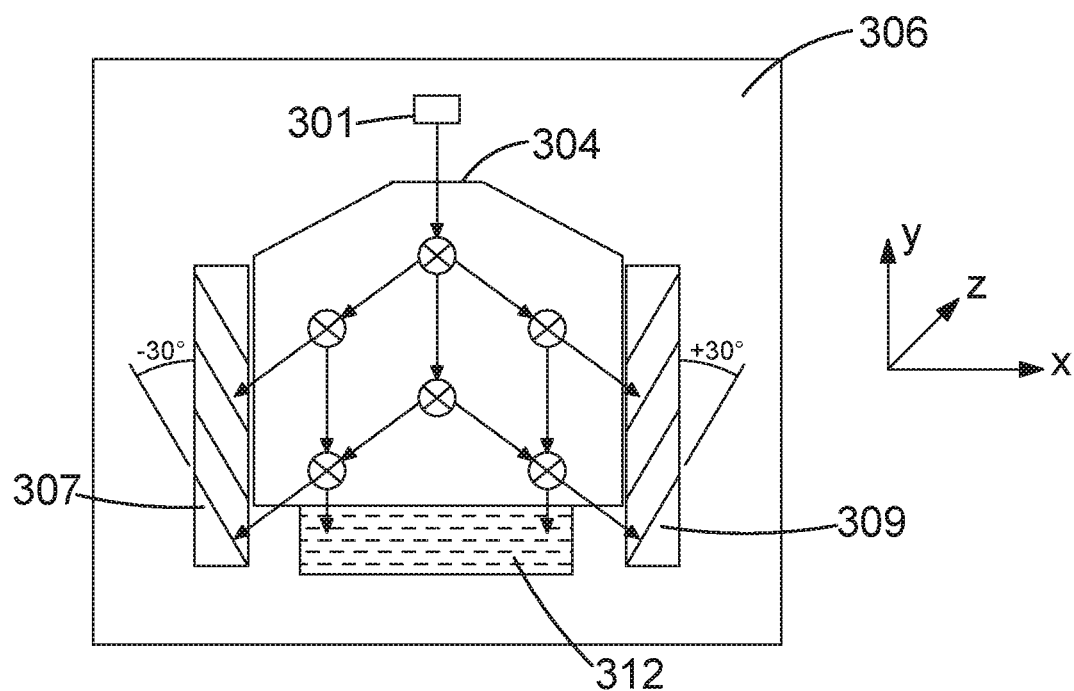
FIG. 9 is a top view of a waveguide in another embodiment of the present invention.

FIG. 9 is a top view of a waveguide 306 in another embodiment of the invention. In this arrangement an input diffraction grating 301 is provided on a surface of the waveguide 306. The grooves of the input grating 301 are oriented parallel to the x-axis in the Cartesian reference frame of FIG. 9. Light from a projector (not shown) is diffracted by the input grating 301 and coupled into the waveguide 306 whereupon it undergoes total internal reflection. Light travels within the waveguide 306 towards an output element 304. In this arrangement the output element 304 is a pair of crossed gratings or a photonic crystal as described in WO 2016/020643. Thus, the output element 304 comprises first and second diffractive optical elements overlaid on one another in or on the waveguide 306. The first diffractive optical element is arranged with rows of diffractive optical structures oriented at an angle of −30° to the y-axis. The second diffractive optical element is arranged with rows of diffractive optical structures oriented at an angle of +30° to the y-axis, within the x-y plane. The first diffractive optical element is configured to receive light from the input grating 301 and to diffract it into an order that extends in a direction angled at +120° to the y-axis. These orders can then be diffracted by the second output diffractive optical element which is orthogonal to the diffracted order extending at +120° to the y-axis so that it can provide outcoupled orders towards a viewer. Similarly, the second output diffractive optical element is configured to receive light from the input grating 301 and diffract it into an order that extends in a direction angled at −120° to the y-axis. These diffracted orders can then be diffracted by the first output diffractive optical element which is orthogonal to the diffracted orders and can provide outcoupled orders towards a viewer. The diffraction efficiencies of the first and second output diffractive optical elements within the output element 304 are chosen to allow the light to simultaneously expand in two-dimensions while providing outcoupled orders towards a viewer as augmented reality images.

The device shown in FIG. 9 also includes first, second and third return gratings 307, 309, 312. The first return grating 307 has grooves oriented at −30° to the y-axis. The second return grating 309 has grooves oriented at +30° to the y-axis. The third return grating 312 has grooves oriented parallel to the x-axis. Each return grating 307, 309, 312 can receive light which has not been coupled towards a viewer by the output element 304 and return the light towards the output element 304.

There is a very large number of possible optical paths within the output element 304, but this can be simplified by considering four options for light upon its first interaction with the output element 304, following diffraction by the input grating 301. First, the light may be undiffracted such that it continues to propagate in the negative y-direction, still captured within the waveguide 306 by total internal reflection. Second, the light may be diffracted by the first diffractive optical element with grooves angled at −30° to the y-axis so that light extends in a direction at +120° to the y-axis. Third, the light may be diffracted by the second diffractive optical element with grooves angled at +30° to the y-axis so that light extends in a direction at −120° to the y-axis. Fourth, light may be diffracted by a superposition of the first and second diffractive optical elements which has effective grooves that are parallel to the x-axis so that light is coupled directly out of the waveguide 306 towards a viewer; this is sometimes referred to as the straight-to-eye (STE) order. The superposition of the first and second diffractive optical elements may be considered as a third diffractive optical element having a grating vector that is angled respectively at 60° to the first and second diffractive optical elements; thus, the grating vectors for the first, second and third diffractive optical elements within the output element 304 may be combined in an equilateral triangle.

In a first optical path light in the waveguide 306 light is diffracted by the input grating 301 and coupled into the waveguide 306 whereupon it undergoes total internal reflection extending in the negative y-direction towards the output element 304. In this first optical path light is undiffracted by the output element 304 and it continues to propagate in the negative y-direction until it encounters the third return grating 312. Light is diffracted by the third return grating 312 so that it returns towards the output element 304 in the positive y-direction. Light then has another opportunity to be diffracted by the output element 304 so that it can be coupled out of the waveguide 306 and towards a viewer. In this exemplary first optical path light the returned light is diffracted by the superposition of the first and second diffractive optical elements having a grating vector that is parallel to the y-axis; in other words, the returned light is a STE order upon interaction with the output element 304, following diffraction by the third return grating 312.

Figure 10:
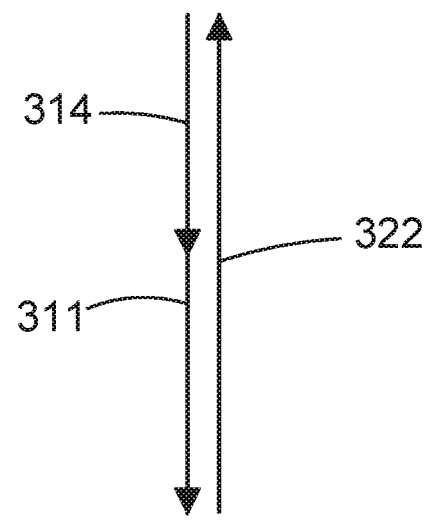
FIG. 10 is a schematic diagram showing grating vectors for one combination of diffractive optical elements in the waveguide shown in FIG. 9.

FIG. 10 is a schematic diagram showing the grating vectors of the input grating 311, the third return grating 322 and the output element 322, where the grating vector of the output element 322 is a superposition of the grating vectors of the first and second diffractive optical elements which are angled at ±30° to the y-axis and are overlaid on top of one another in the waveguide; the equal and opposite components aligned with the x-axis cancel one another, leaving a resultant vector that is aligned with the y-axis. Light in the first optical path is therefore diffracted by three diffractive optical elements before it is coupled towards a viewer. In this example, the input grating 301 diffracts light into a +1 order, the return grating 312 diffracts light into a −1 order and the output element 304 diffracts light into a +1 order. The grating vectors 311, 322, 314 can therefore be added together as shown in FIG. 10 to produce a resultant vector having substantially zero magnitude. This is achieved because the return grating 312 has a pitch that is half that of the input grating 301 and the superposition of the first and second output diffractive optical elements in the output element 304.

In a second exemplary optical path in the waveguide 306, light is diffracted by the input grating 301 and subsequently light is diffracted by the first diffractive optical element with grooves angled at −30° to the y-axis. The diffracted light extends in a direction that is oriented at +120° to the y-axis (i.e. in a direction that is towards the second return grating 309). Light continues to propagate towards the second return grating 309 and at each interaction with the output element 304 light is either diffracted by the second diffractive optical element having grooves oriented at +30° to the y-axis so that it can be coupled out of the waveguide 306 towards a viewer or else it is undiffracted and continues to propagate towards the second return grating 309, in a direction that is oriented at 120° to the y-axis. Some light remains undiffracted by the second diffractive optical element in which case it encounters the second return grating 309. The second return grating 309 diffracts the light so that it is returned towards the output element 304 in the opposite direction (i.e. in a direction that is oriented at −60° to the y-axis). The returned light has another opportunity to interact with the second diffractive optical element with grooves oriented at +30°. When light is diffracted by the second diffractive optical element it is coupled out of the waveguide 306 towards a viewer in a direction that is parallel to the z-axis.

Figure 11:
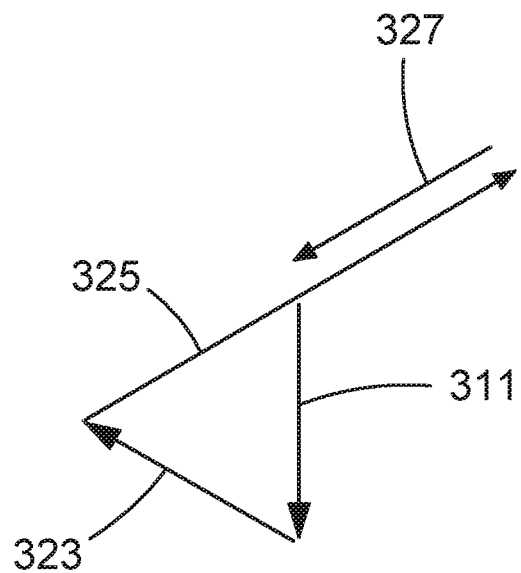
FIG. 11 is a schematic diagram showing grating vectors for another combination of diffractive optical elements in the waveguide shown in FIG. 9.

FIG. 11 is a schematic diagram showing grating vectors for the active diffractive interactions along this second exemplary optical path. Thus, light is diffracted sequentially by the input grating 301, the first diffractive optical element with grooves angled at −30° to the y-axis, the second return grating 309 and finally by the second diffractive optical element with grooves angled at +30° to the y-axis. The respective grating vectors 311, 323, 325, 327 can be added together to produce a resultant vector having zero magnitude. The grating vector 311 for the input grating is oriented at 60° to the grating vector 323 for the first diffractive optical element, and these grating vectors 311, 323 have the same magnitude. The grating vector 325 for the second return grating is angled at 60° to the grating vector 323 for the first diffractive optical element, but has twice the magnitude. Finally, the grating vector 327 for the second diffractive optical element is oriented in the same direction as the grating vector 325 for the second return grating, but has half the magnitude.

A third exemplary optical path is also discussed, which is a mirror image of the second exemplary optical path. Thus, in this third optical path in the waveguide 306, light is diffracted by the input grating 301 and subsequently light is diffracted by the second diffractive optical element with grooves angled at +30° to the y-axis. The diffracted light extends in a direction that is oriented at −120° to the y-axis (i.e. in a direction that is towards the first return grating 307). Light continues to propagate towards the first return grating 307 and at each interaction with the output element 304 light is either diffracted by the first diffractive optical element having grooves oriented at −30° to the y-axis so that it can be coupled out of the waveguide 306 towards a viewer or else it is undiffracted and continues to propagate towards the first return grating 307, in a direction that is oriented at −120° to the y-axis. Some light remains undiffracted by the first diffractive optical element in which case it encounters the first return grating 307. The first return grating 307 diffracts the light so that it is returned towards the output element 304 in the opposite direction (i.e. in a direction that is oriented at +60° to the y-axis). The returned light has another opportunity to interact with the first diffractive optical element with grooves oriented at −30° to the y-axis. When light is diffracted by the first diffractive optical element it is coupled out of the waveguide 306 towards a viewer in a direction that is parallel to the z-axis.

Figure 12:
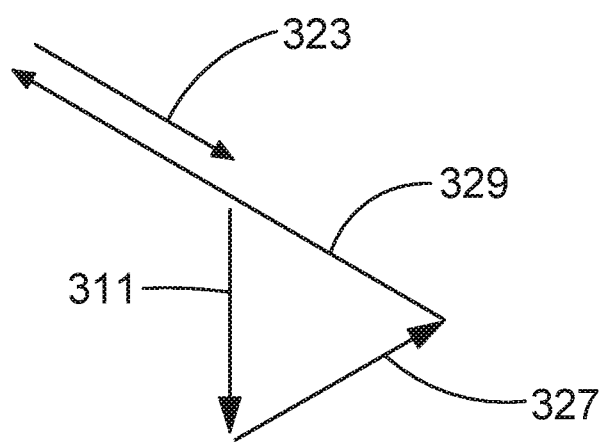
FIG. 12 is a schematic diagram showing grating vectors for another combination of diffractive optical elements in the waveguide shown in FIG. 9.

FIG. 12 is a schematic diagram showing grating vectors for the active diffractive interactions along this third exemplary optical path. Thus, light is diffracted sequentially by the input grating 301, the second diffractive optical element with grooves angled at +30° to the y-axis, the first return grating 307 and finally by the first diffractive optical element with grooves angled at −30° to the y-axis. The respective grating vectors 311, 327, 329, 323 can be added together to produce a resultant vector having zero magnitude. The grating vector 311 for the input grating is oriented at 60° to the grating vector 327 for the second diffractive optical element, and these grating vectors 311, 327 have the same magnitude. The grating vector 329 for the first return grating is angled at 60° to the grating vector 327 for the first diffractive optical element, but has twice the magnitude.

Finally, the grating vector 323 for the first diffractive optical element is oriented in the same direction as the grating vector 329 for the first return grating, but has half the magnitude.

In this way, the first, second and third return gratings 307, 309, 312 can return light towards the output element 304. This can reduce scatter from waveguide edges, thereby improving the contrast of augmented reality images that are coupled out of the waveguide 306 and towards the viewer along the z-axis.

Figure 13:
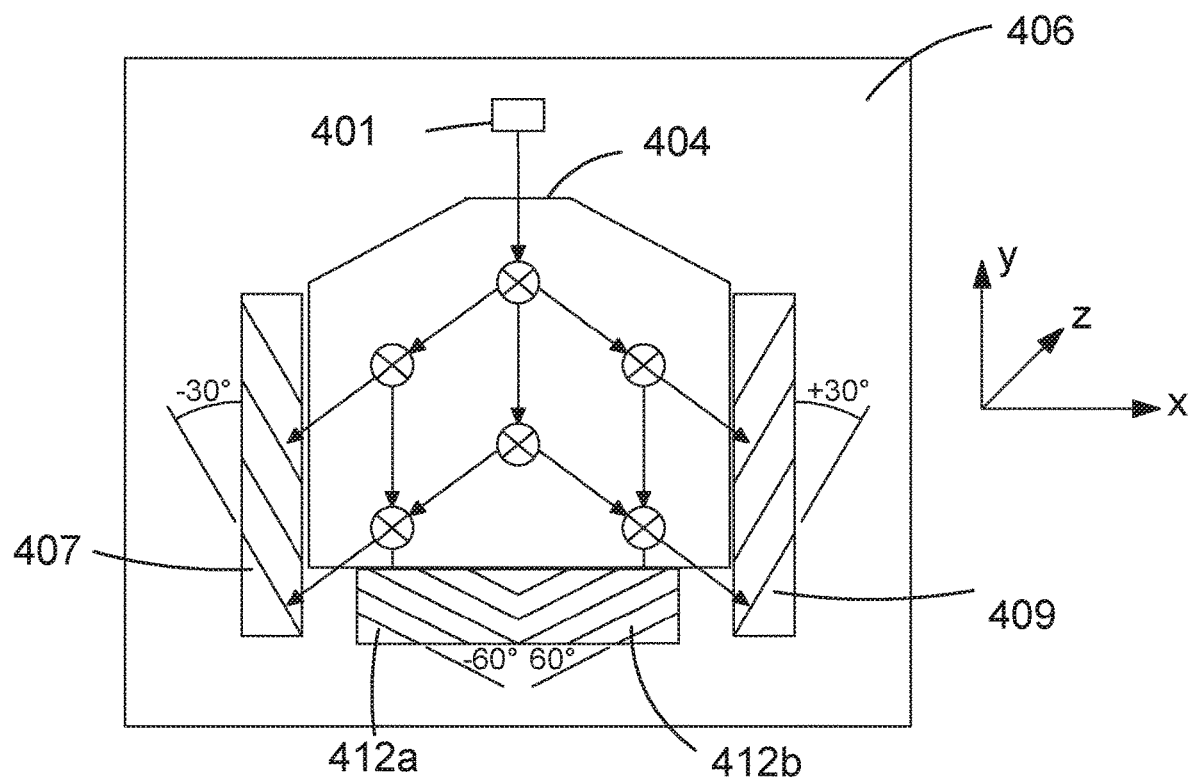
FIG. 13 is a top view of a waveguide in another embodiment of the present invention.

FIG. 13 is a top view of a waveguide 406 in another embodiment of the invention, which is structurally similar to the waveguide 306 described above and shown in FIG. 9. In the arrangement of FIG. 13, the third return grating includes a first portion 412a and a second portion 412b. The first portion 412a of the third return grating has grooves oriented at −60° to the y-axis. The second portion 412b of the third return grating has grooves oriented at +60° to the y-axis. Each return grating 407, 409, 412a, 412b can receive light which has not been coupled towards a viewer by the output element 404 and return the light towards the output element 404.

In a first exemplary optical path in the waveguide 406 light is diffracted by the input grating 401 and coupled into the waveguide 406 whereupon it undergoes total internal reflection extending in the negative y-direction towards the output element 404. In this first optical path light is initially undiffracted by the output element 304 and it continues to propagate in the negative y-direction. At a certain position light is then diffracted by the second diffractive optical element within the output element 304, having grooves angled at +30° to the y-axis. The diffracted light extends in a direction that is oriented at −120° to the y-axis (i.e. downwards and leftwards in the top view of FIG. 13). Light continues to propagate in this direction until it encounters the first portion 412a of the third return grating. In other words, light is diffracted in the output element 404 at a position with respect to the y-axis which means that it encounters the first portion 412a of the third return grating, rather than the first return grating 407. Light is diffracted by the first portion 412a of the third return grating so that it returns towards the output element 404 in the positive y-direction (i.e. parallel to the y-axis). In this exemplary first optical path the returned light is diffracted by the superposition of the first and second diffractive optical elements having a grating vector that is parallel to the y-axis; in other words, the returned light is a STE order upon interaction with the output element 404, following diffraction by the first portion 412a of the third return grating 412.

Figure 14:
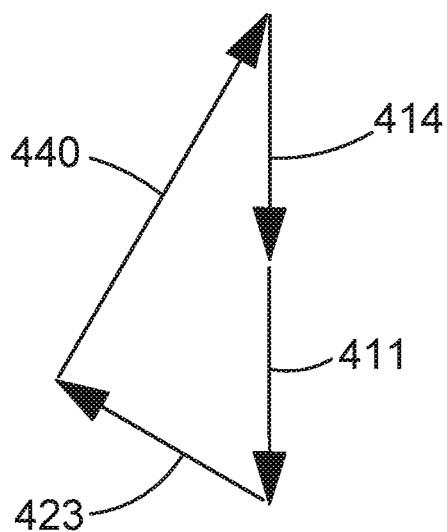
FIG. 14 is a schematic diagram showing grating vectors for one combination of diffractive optical elements in the waveguide shown in FIG. 13.

FIG. 14 is a schematic diagram showing grating vectors for the active diffractive interactions along this first exemplary optical path. Thus, light is diffracted sequentially by the input grating 401, the second diffractive optical element with grooves angled at +30° to the y-axis, the first portion 412a of the third return grating, with grooves angled at −60° to the y-axis, and finally by a superposition of the grating vectors of the first and second diffractive optical elements which has a grating vector that is aligned with the y-axis (i.e. effective grooves which are parallel to the x-axis). These four sequential diffractive interactions are depicted by grating vectors 411, 423, 440, 414. The input grating 401 has grooves oriented parallel to the x-axis and with a groove separation 'd'. Thus, grating vector 411 (for the input grating 401) is parallel to the y-axis. The second diffractive optical element with grooves angled at +30° to the y-axis also has a groove separation 'd'. The first portion 412a of the third return grating has grooves angled at −60° to the y-axis and a groove separation which is d/(2*cos(30°)). Finally, the grating vector 414 corresponding to the superposition of the grating vectors of the first and second diffractive optical elements has an effective groove separation which is 'd'. When these grating vectors 411, 423, 440, 414 are combined they produce a resultant vector which has substantially zero magnitude, which means that this sequence of diffractive interactions can provide outcoupled orders towards a viewer with minimum angular and chromatic aberrations.

Figure 16:
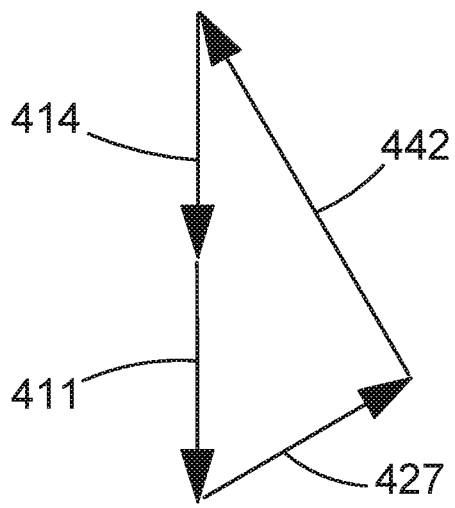
FIG. 16 is a schematic diagram showing grating vectors for another combination of diffractive optical elements in the waveguide shown in FIG. 13.

A second exemplary optical path can be considered, which is effectively a mirror image of the first exemplary optical path described above, about the y-axis. Thus, 406 light is diffracted sequentially by the input grating 401, the first diffractive optical element within the output element 304, having grooves angled at −30° to the y-axis, the second portion 412b of the third return grating, and finally by the superposition of the first and second diffractive optical elements having a grating vector that is parallel to the y-axis. These four sequential diffractive interactions are depicted in FIG. 16 with grating vectors 411, 427, 442, 414. The input grating 401 has grooves oriented parallel to the x-axis and a groove separation 'd'. Thus, grating vector 411 (for the input grating 401) is parallel to the y-axis. The first diffractive optical element has grooves angled at −30° to the y-axis and also has a groove separation 'd'. The second portion 412b of the third return grating has grooves angled at +60° to the y-axis and a groove separation which is d/(2*cos(30°)). Finally, the grating vector 414 corresponding to the superposition of the grating vectors of the first and second diffractive optical elements has an effective groove separation which is 'd'. When these grating vectors 411, 427, 442, 414 are combined they produce a resultant vector which is substantially zero magnitude, which means that this sequence of diffractive interactions can provide outcoupled orders towards a viewer with minimum angular and chromatic aberrations.

Figure 15:
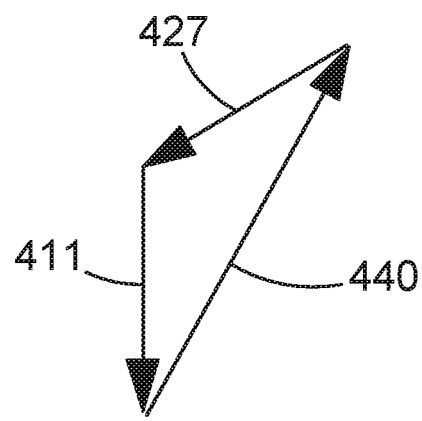
FIG. 15 is a schematic diagram showing grating vectors for another combination of diffractive optical elements in the waveguide shown in FIG. 13.

In a third exemplary optical path, in the waveguide 406 light is diffracted by the input grating 401 and coupled into the waveguide 406 whereupon it undergoes total internal reflection extending in the negative y-direction towards the output element 404. In this third optical path light is undiffracted by the output element 304 and it continues to propagate in the negative y-direction towards the third return grating whereupon it is diffracted by the first portion 412a of the third return grating. The diffracted light extends back towards the output element 404 whereupon it is diffracted by the first diffractive optical element within the output element 404, having grooves angled at +30° to the y-axis, and coupled out of the waveguide 406 towards a viewer in a direction that is parallel with the z-axis. These three sequential diffractive interactions are depicted in FIG. 15 with grating vectors 411, 440, 427 which are added together to produce a resultant vector with substantially zero magnitude.

Figure 17:
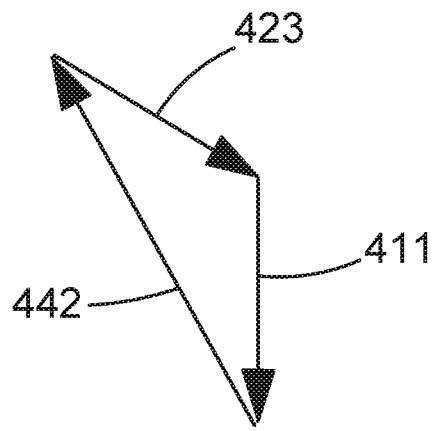
FIG. 17 is a schematic diagram showing grating vectors for another combination of diffractive optical elements in the waveguide shown in FIG. 13.

A fourth exemplary optical path is effectively a mirror opposite of the third exemplary optical path, about the y-axis. Thus, light is diffracted by the input grating 401 and coupled into the waveguide 406 whereupon it undergoes total internal reflection extending in the negative y-direction towards the output element 404. Light is undiffracted by the output element 304 and it continues to propagate in the negative y-direction towards the third return grating whereupon it is diffracted by the second portion 412b of the third return grating. The diffracted light extends back towards the output element 404 whereupon it is diffracted by the second diffractive optical element within the output element 404, having grooves angled at −30° to the y-axis, and coupled out of the waveguide 406 towards a viewer in a direction that is parallel with the z-axis. These three sequential diffractive interactions are depicted in FIG. 17 with grating vectors 411, 442, 423 which are added together to produce a resultant vector with substantially zero magnitude.

In this way, the first and second portions 412a, 412b of the third return grating in FIG. 13 allow light to be returned to the output element both when rays are received undiffracted from the output element 404 and when a single turning diffractive interaction has taken place.

Figure 18:
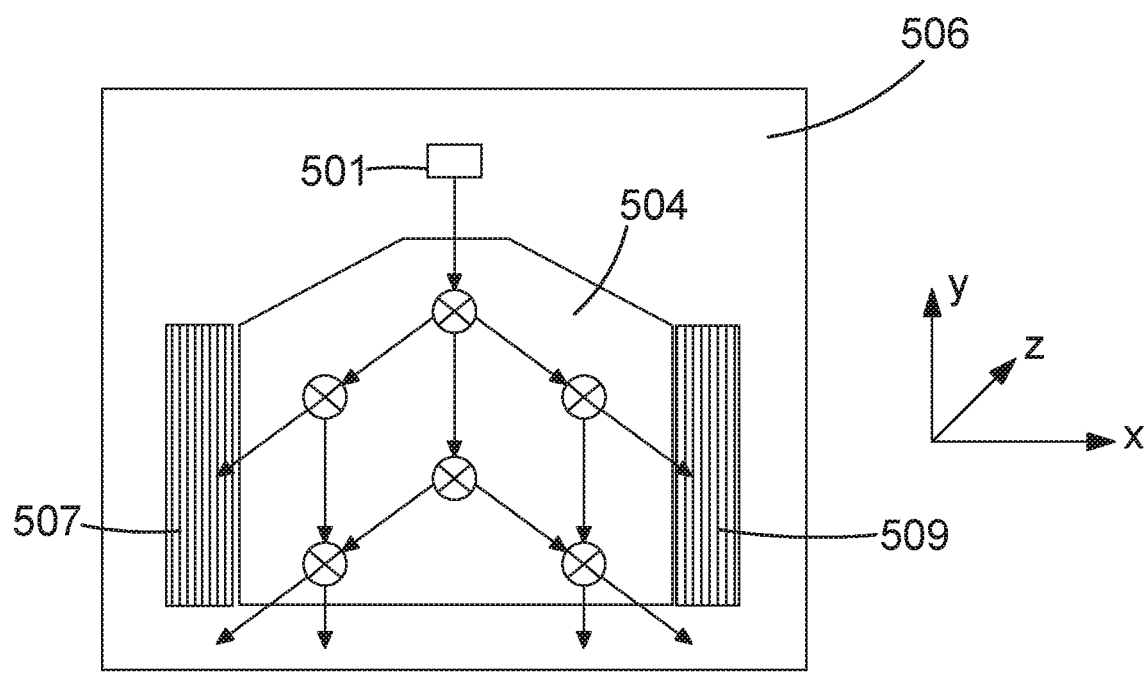
FIG. 18 is a top view of a waveguide in another embodiment of the present invention.

FIG. 18 is a top view of another waveguide 506 in an embodiment of the invention, which is structurally similar to the waveguide 306 described above and shown in FIG. 9. In the arrangement of FIG. 18, however, the first return grating 507, situated to the left of the output element 504, has grooves oriented parallel to the y-axis. The second return grating 509, situated to the right of the output element 504 also has grooves oriented parallel to the y-axis. For the sake of simplicity, no third return grating is shown, although it would be possible to include a third return grating in a similar way to that shown in FIG. 9 or 13.

Figure 19:
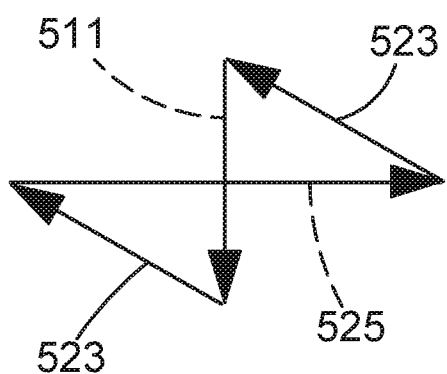
FIG. 19 is a schematic diagram showing grating vectors for one combination of diffractive optical elements in the waveguide shown in FIG. 18.

In a first exemplary optical path in the waveguide 506 light is diffracted by the input grating 501 and coupled into the waveguide 506 whereupon it undergoes total internal reflection extending in the negative y-direction towards the output element 504. In this first optical path light is diffracted by the second diffractive optical element within the output element 504, having grooves angled at +30° to the y-axis. The diffracted light extends in a direction that is oriented at −120° to the y-axis (i.e. downwards and leftwards in the top view of FIG. 18) until it encounters the first return grating 507, whereupon light is diffracted back towards the output element 504. Light is then diffracted again by the second diffracted optical element, having grooves angled at +30° to the y-axis, so that it is coupled out of the waveguide 506 along the z-axis towards a viewer. The grating pitches are selected so that the respective grating vectors can be combined to produce a resultant vector having substantially zero magnitude. FIG. 19 is a schematic diagram showing grating vectors for the active diffractive interactions along this first exemplary optical path. Thus, light is diffracted sequentially by the input grating 401, the second diffractive optical element with grooves angled at +30° to the y-axis, the first return grating 507, and finally, once more by the second diffractive optical element with grooves angled at +30° to the y-axis. These four sequential diffractive interactions are depicted by grating vectors 511, 523, 515, 523. The input grating 401 has grooves oriented parallel to the x-axis and with a separation 'd'. Thus, grating vector 411 (for the input grating 401) is parallel to the y-axis. The second diffractive optical element with grooves angled at +30° to the y-axis also has a groove separation 'd'. The first return grating 507 has grooves angled parallel to the y-axis and a groove separation which is $d/(2*\sin(60°))$. Finally, the second diffractive optical element with grooves angled at +30° to the y-axis also has a groove separation 'd'.

Figure 20:
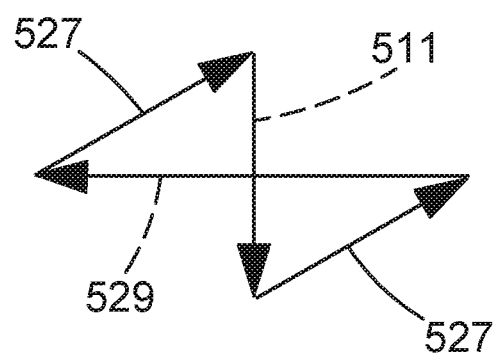
FIG. 20 is a schematic diagram showing grating vectors for another combination of diffractive optical elements in the waveguide shown in FIG. 18.

A second exemplary optical path is effectively a mirror image of the first optical path described above, about the y-axis. In this second optical path, light is diffracted by the input grating 501 and coupled into the waveguide 506 whereupon it undergoes total internal reflection extending in the negative y-direction towards the output element 504. Light is then diffracted by the first diffractive optical element within the output element 504, having grooves angled at −30° to the y-axis. The diffracted light extends in a direction that is oriented at +120° to the y-axis (i.e. downwards and rightwards in the top view of FIG. 18) until it encounters the second return grating 509, whereupon light is diffracted back towards the output element 504. Light is then diffracted again by the first diffractive optical element, having grooves angled at −30° to the y-axis, so that it is coupled out of the waveguide 506 along the z-axis towards a viewer. The grating pitches are selected so that the respective grating vectors can be combined to produce a resultant vector having substantially zero magnitude. FIG. 20 is a schematic diagram showing grating vectors for the active diffractive interactions along this second exemplary optical path. Thus, light is diffracted sequentially by the input grating 501, the first diffractive optical element with grooves angled at −30° to the y-axis, the second return grating 509, and finally, once more by the first diffractive optical element with grooves angled at −30° to the y-axis. These four sequential diffractive interactions are depicted by grating vectors 511, 527, 529, 527. The second return grating 509 has grooves angled parallel to the y-axis and a groove separation which is $d/(2*\sin(60°))$. Thus, the four gratings can be combined additively to produce a resultant vector having substantially zero magnitude. This provides a return grating arrangement that can effectively return light towards the output element 504, thereby improving image contrast within the output element 504 by reducing scatter from waveguide edges.

The above description refers to surface relief gratings. However, the person skilled in the art will recognise that the concepts can be extended to all types of grating, including volume gratings.

The invention claimed is:

1. An augmented reality device, comprising:
   a waveguide;
   an input diffractive optical element positioned in or on the waveguide configured to receive light from a projector and to couple the light into the waveguide so that it is captured within the waveguide by total internal reflection;
   an output diffractive optical element positioned in or on the waveguide configured to couple totally internally reflected light out of the waveguide towards a viewer; and
   a returning diffractive optical element positioned in or on the waveguide configured to receive light from the output diffractive optical element and to diffract the received light so that it is returned toward the output diffractive optical element;
   wherein the output diffractive optical element comprises first and second output diffractive optical elements overlaid on one another in or on the waveguide, wherein the first output diffractive optical element is configured to receive light from an input direction and coupled it toward the second output diffractive optical element which can then provide outcoupled orders towards a viewer, and the second output diffractive optical element is configured to receive light from an input direction and couple it towards the first output diffractive optical element which can then provide outcoupled orders towards a viewer;
   wherein the returning diffractive optical element comprises first and second returning diffractive optical elements, wherein the first returning diffractive optical element is positioned to receive light from the first output diffractive optical element and to diffract the receive light so that it is returned towards the output diffractive optical element which can then provide outcoupled orders towards a viewer, and wherein the second returning diffractive optical element is positioned to receive light from the second output diffractive optical element and to diffract the received light so that it is returned towards the output diffractive optical element which can then provide outcoupled orders towards a viewer.

2. The augmented reality device of claim 1, wherein rays of light that are coupled out of the waveguide towards a viewer undergo diffraction by a plurality of diffractive optical elements having grating vectors that combine to produce a resultant vector with substantially zero magnitude.

3. The augmented reality device of claim 2, wherein the resultant vector of the grating vectors for the input diffractive optical element and the output diffractive optical element combine to produce a resultant vector with substantially zero magnitude.

4. The augmented reality device of claim 2, wherein the resultant vector of the grating vectors for the input diffractive optical element, the returning diffractive optical element and the output diffractive optical element combine to produce a resultant vector with substantially zero magnitude.

5. The augmented reality device of claim 1, further comprising an intermediate diffractive optical element positioned in or on the waveguide between the input diffractive optical element and the output diffractive optical element.

6. The augmented reality device of claim 5, wherein grating vectors for the input diffractive optical element, the intermediate diffractive optical element and the output diffractive optical element combine to produce a resultant vector with substantially zero magnitude.

7. The augmented reality device of claim 5, wherein grating vectors for the input diffractive optical element, the intermediate diffractive optical element, the returning diffractive optical element and the output diffractive optical element combine to produce a resultant vector with substantially zero magnitude.

8. The augmented reality device of claim 1, wherein the output diffractive optical element comprises a plurality of optical structures in a photonic crystal, wherein the plurality of optical structures is arranged in an array to provide the first and second output diffractive optical elements.

9. The augmented reality device of claim 1, further comprising a third returning diffractive optical element positioned to receive light from the first and second output diffractive optical elements and to diffract the received light so that it is returned towards the first and second output diffractive optical elements.

10. A method for operating an augmented reality device, comprising:
projecting light toward an input diffractive optical element positioned in or on a waveguide;
coupling the light into the waveguide via the input diffractive optical element so that the light is captured within the waveguide by total internal reflection;
coupling the totally internally reflected light out of the waveguide towards a viewer via an output diffractive optical element positioned in or on the waveguide;
receiving the light from the output diffractive optical element at a returning diffractive optical element positioned in or on the waveguide; and
diffracting the received light via the returning diffractive optical element so that the light is returned toward the output diffractive optical element;
wherein the output diffractive optical element comprises first and second output diffractive optical elements overlaid on one another in or on the waveguide, wherein the first output diffractive optical element is configured to receive light from an input direction and coupled it toward the second output diffractive optical element which can then provide outcoupled orders towards a viewer, and the second output diffractive optical element is configured to receive light from an input direction and couple it towards the first output diffractive optical element which can then provide outcoupled orders towards a viewer;
wherein the returning diffractive optical element comprises first and second returning diffractive optical elements, wherein the first returning diffractive optical element is positioned to receive light from the first output diffractive optical element and to diffract the receive light so that it is returned towards the output diffractive optical element which can then provide outcoupled orders towards a viewer, and wherein the second returning diffractive optical element is positioned to receive light from the second output diffractive optical element and to diffract the received light so that it is returned towards the output diffractive optical element which can then provide outcoupled orders towards a viewer.

11. The method of claim 10, wherein rays of light that are coupled out of the waveguide towards a viewer undergo diffraction by a plurality of diffractive optical elements having grating vectors that combine to produce a resultant vector with substantially zero magnitude.

12. The method of claim 11, wherein the resultant vector of the grating vectors for the input diffractive optical element and the output diffractive optical element combine to produce a resultant vector with substantially zero magnitude.

13. The method of claim 11, wherein the resultant vector of the grating vectors for the input diffractive optical element, the returning diffractive optical element and the output diffractive optical element combine to produce a resultant vector with substantially zero magnitude.

14. The method of claim 10, wherein the waveguide further comprises an intermediate diffractive optical element positioned in or on the waveguide between the input diffractive optical element and the output diffractive optical element.

15. The method of claim 14, wherein grating vectors for the input diffractive optical element, the intermediate diffractive optical element and the output diffractive optical element combine to produce a resultant vector with substantially zero magnitude.

16. The method of claim 14, wherein grating vectors for the input diffractive optical element, the intermediate diffractive optical element, the returning diffractive optical element and the output diffractive optical element combine to produce a resultant vector with substantially zero magnitude.

17. The method of claim 10, wherein the output diffractive optical element comprises a plurality of optical structures in a photonic crystal, wherein the plurality of optical structures are arranged in an array to provide the first and second output diffractive optical elements.

18. The method of claim 10, further comprising receiving, at a third returning diffractive optical element of the waveguide, light from the first and second output diffractive optical elements and to diffract the received light so that the light is returned towards the first and second output diffractive optical elements.

19. A waveguide, comprising:
an input diffractive optical element positioned in or on the waveguide configured to receive light from a projector and to couple the light into the waveguide so that it is captured within the waveguide by total internal reflection;

an output diffractive optical element positioned in or on the waveguide configured to couple totally internally reflected light out of the waveguide towards a viewer; and a returning diffractive optical element positioned in or on the waveguide configured to receive light from the output diffractive optical element and to diffract the received light so that it is returned toward the output diffractive optical element;

wherein the output diffractive optical element comprises first and second output diffractive optical elements overlaid on one another in or on the waveguide, wherein the first output diffractive optical element is configured to receive light from an input direction and coupled it toward the second output diffractive optical element which can then provide outcoupled orders towards a viewer, and the second output diffractive optical element is configured to receive light from an input direction and couple it towards the first output diffractive optical element which can then provide outcoupled orders towards a viewer;

wherein the returning diffractive optical element comprises first and second returning diffractive optical elements, wherein the first returning diffractive optical element is positioned to receive light from the first output diffractive optical element and to diffract the receive light so that it is returned towards the output diffractive optical element which can then provide outcoupled orders towards a viewer, and wherein the second returning diffractive optical element is positioned to receive light from the second output diffractive optical element and to diffract the received light so that it is returned towards the output diffractive optical element which can then provide outcoupled orders towards a viewer.

20. The waveguide of claim 19, wherein rays of light that are coupled out of the waveguide towards a viewer undergo diffraction by a plurality of diffractive optical elements having grating vectors that combine to produce a resultant vector with substantially zero magnitude.

* * * * *